United States Patent
Stützer et al.

(10) Patent No.: US 10,981,213 B2
(45) Date of Patent: Apr. 20, 2021

(54) METHOD AND APPARATUS FOR SETTING A SCREW

(71) Applicant: Weber Schraubautomaten GmbH, Wolfratshausen (DE)

(72) Inventors: Robert Stützer, Munich (DE); Christian Schönig, Penzberg (DE)

(73) Assignee: Weber Schraubautomaten GmbH

(*) Notice: Subject to any disclaimer, the term of this patent is extended or adjusted under 35 U.S.C. 154(b) by 210 days.

(21) Appl. No.: 15/872,180

(22) Filed: Jan. 16, 2018

(65) Prior Publication Data

US 2018/0200780 A1  Jul. 19, 2018

(30) Foreign Application Priority Data

Jan. 17, 2017  (DE) .......................... 102017100813.6

(51) Int. Cl.
  *B21J 5/06*   (2006.01)
  *F16B 25/00*  (2006.01)
  *F16B 25/10*  (2006.01)
  *B23P 19/06*  (2006.01)

(52) U.S. Cl.
  CPC ............... *B21J 5/066* (2013.01); *B23P 19/06* (2013.01); *B23P 19/065* (2013.01); *F16B 25/0021* (2013.01); *F16B 25/106* (2013.01)

(58) Field of Classification Search
  CPC ..... B21J 5/066; F16B 25/106; F16B 25/0021; B23P 19/065; B23P 19/06
  See application file for complete search history.

(56) References Cited

U.S. PATENT DOCUMENTS

| 4,175,413 A | * | 11/1979 | van Geffen | ........... B21C 37/298 |
| | | | | 408/130 |
| 10,010,928 B2 | * | 7/2018 | Zinn | ...................... B23K 20/16 |

FOREIGN PATENT DOCUMENTS

| DE | 4225157 A1 | 2/1994 |
| DE | 19634417 C2 | 7/1998 |
| DE | 10348427 A1 | 5/2005 |
| DE | 102007024627 B3 | 1/2009 |
| DE | 102011109815 A1 | 2/2013 |
| EP | 1995021 A3 | 6/2010 |
| EP | 2289659 A1 | 3/2011 |
| EP | 1995021 B1 | 4/2014 |
| EP | 2954973 A1 | 12/2015 |
| WO | 2014036985 A1 | 3/2014 |

OTHER PUBLICATIONS

European Search Report for European Application No. 17206651.6 dated May 23, 2018, 3 pages.
German Search Report for German Application No. 102017100813.6 dated May 29, 2018, 6 pages.

* cited by examiner

*Primary Examiner* — John C Hong
(74) *Attorney, Agent, or Firm* — Dickinson Wright PLLC

(57) ABSTRACT

The invention relates to a method and to an apparatus for setting a screw, in particular a flow drilling screw. In accordance with the method, the screw is driven at a first revolution speed and at a first axial feed force during a time-limited first phase to drive the screw through at least one component. In the event that the screw does not penetrate the component during the first phase, the screw is automatically driven at a second revolution speed that is higher than a first rotation speed and/or at a second axial feed force that is greater than a first axial feed force during a second phase subsequent to the first phase.

7 Claims, 3 Drawing Sheets

METHOD AND APPARATUS FOR SETTING A SCREW

Figure 1:
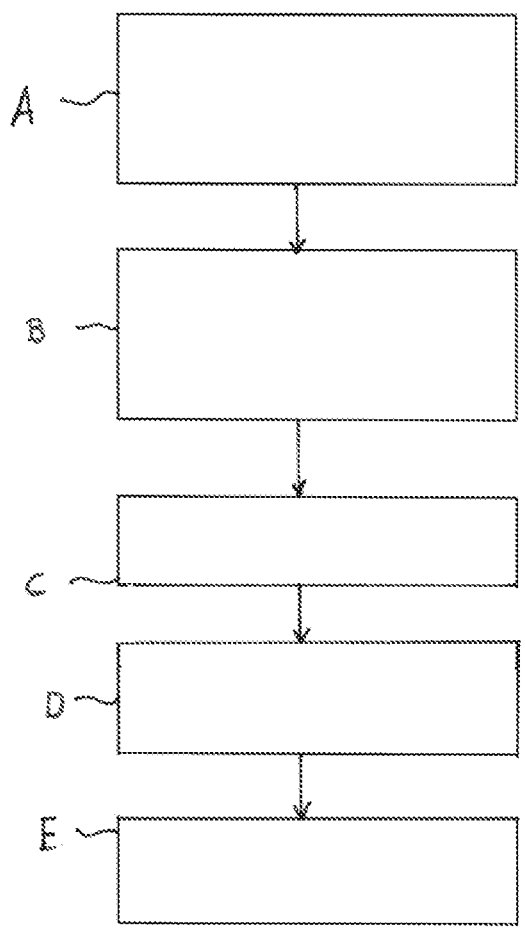

The present invention relates to a method and to an apparatus for setting a screw, in particular a flow-drilling screw.

It is known from the prior art to introduce flow-drilling screws into a component by means of a screwing apparatus that applies a predefined revolution speed and a predefined axial feed force to the screw. If it is found that the process of introducing or setting the screw takes too long or is not possible due to too low a revolution speed or too small an axial feed force, the revolution speed or the axial feed force can be increased on the setting of the next screw with some screwing apparatus to shorten the process. Material-specific values for the revolution speed and for the axial feed force can be stored in the screwing apparatus for materials that are frequently used for components. A presetting of the screwing apparatus for specific materials can thus be provided.

All these processes have the disadvantage that the applied revolution speed or the applied axial feed force of the screwing apparatus has to be set or adapted by a user to set the next screw as efficiently as possible.

It is the underlying object of the invention to provide a method and an apparatus that makes the setting of screws even more efficient.

The object is satisfied by a method having the features of the independent method claim and in particular in that it is determined whether the screw penetrates the component and in that, in the event that the screw does not penetrate the component during a first phase, the screw is automatically driven at a second revolution speed that is higher than a first revolution speed and/or at a second axial feed force that is greater than a first axial feed force during a second phase subsequent to the first phase. The second phase so-to-say therefore forms a "boost" phase.

It is the general idea underlying the invention to determine whether the screw penetrates the component during the first phase and, if this is not the case after the end of the first phase, to increase the energy input into the component to accelerate the setting of the screw. The required energy input, for example the required revolution speed and/or the required axial feed force, is/are thus individually determined and applied for each screw to set the screw as efficiently as possible, i.e. as fast and as energy-saving as possible. Fluctuations in the material consistence of the component such as in the strength of the material or in the thickness of the material are automatically compensated in that each screw is introduced into the component at the individually matching revolution speed and/or axial feed force.

Advantageous embodiments can be found in the dependent claims, in the description and in the drawings.

To make the setting of screws particularly economical, it is advantageous to allow the first phase to last a maximum of one second. The first phase preferably lasts between 0.3 seconds and 0.7 seconds, for example approximately 0.5 seconds.

In accordance with an embodiment, the revolution speed is continuously, i.e. constantly, increased during the second phase. The revolution speed is preferably constantly increased at least stage-wise during the second phase. The revolution speed is in particular constantly increased during a stage of the second phase in which the revolution speed is increased. Alternatively, the revolution speed is increased step-wise during the second phase. The step-wise increases of the revolution speed can in particular be equal and/or take place after equal time intervals.

Alternatively or additionally, the axial feed force can be continuously increased during the second phase. The axial feed force is preferably constantly increased at least stage-wise during the second phase. The axial feed force during a stage of the second phase in which the axial feed force is increased is in particular constantly increased. Alternatively, the axial feed force is increased step-wise during the second phase. The step-wise increases of the axial feed force can in particular be equal and/or take place after equal time intervals.

In accordance with an embodiment, the revolution speed is increased up to a maximum value during the second phase provided that the screw has not yet penetrated the component. The revolution speed can subsequently be maintained at the respective maximum value until the screw has penetrated the component. It can thus be ensured that the drive of a screwing apparatus with which the method is performed is not overloaded.

The length of the stage of the second phase during which the revolution speed is increased up to the maximum value can amount to up to 3 seconds. The length of the this stage is preferably between 0.5 and 1.5 seconds.

Alternatively or additionally, the axial feed force can be increased up to a maximum value during the second phase provided that the screw has not yet penetrated the component. The axial feed force can subsequently be maintained at the respective maximum value until the screw has penetrated the component.

The length of the stage of the second phase during which the axial feed force is increased up to the maximum value can be equal to the length of the stage of the second phase during which the revolution speed is increased up to the maximum value. The length of the stage of the second phase during which the axial feed force is increased up to the maximum value can amount to up to 3 seconds. The length of the this stage is also preferably between 0.5 and 1.5 seconds.

The revolution speed is advantageously not further increased after the penetration of the screw through the component. The revolution speed is preferably even reduced after the penetration of the screw through the component. It is thus ensured that the screw can tap or groove a thread into the component without destroying the thread.

Alternatively or additionally, the axial feed force is preferably not further increased after the penetration of the screw through the component. It is also advantageous here to reduce the axial feed force after the penetration of the screw through the component.

The revolution speed at the point in time of the penetration of the screw through the component can be determined as a measure for the energy that was required for setting the screw. Alternatively or additionally, the applied axial feed force at the point in time of the penetration of the screw through the component can be measured and/or the duration of the second phase up to the penetration of the screw through the component can be measured.

A local mechanical resistance of the component is preferably established using the revolution speed, the axial feed force and/or the duration of the second phase up to the penetration of the screw through the component. The thickness of the component at the respective position and the strength of the component at the respective position are above all crucial here.

The local mechanical resistance of the component can in particular be established using a determined desired revolution speed and/or a determined desired feed force at the point in time of the penetration of the screw. Expensive measurement equipment for the actual measurement of the actual revolution speed or of the actual feed force can be saved in this manner.

Once the screw has penetrated the component, for example two metal sheets disposed over one another, and once a thread has formed in the metal sheet remote from the screw head, the screw has to be tightened to securely connect the metal sheets to one another. An ideal tightening torque which is required for this purpose and by which the screw scan be tightened can be established in dependence on the mechanical resistance of the component. The ideal tightening torque can in particular be calculated directly by means of the revolution speed, by means of the axial feed force, and/or by means of the duration of the second phase up to the penetration of the screw through the component. This has the advantage that the screw can be tightened such that it holds as securely as possible, i.e. is provided with a sufficient preload force, without tearing out due to an overload of the material of the component.

In general terms, the ideal tightening torque is therefore preferably not optimized step-wise by a learning process from screw to screw, but is rather directly established respectively individually for each screw during the setting of the screw. A parameter is, for example, measured for this purpose that is suitable for establishing a mechanical resistance, in particular the wall thickness of the component and/or the strength of the component, during the entry and penetration. The ideal tightening torque for the respective screw is then so-to-say determined in real time in dependence on how high the mechanical resistance of the component was at the setting point of the screw. Finally, the screw is tightened using the determined ideal tightening torque.

In accordance with a specific embodiment, an increased tightening torque $M_a$ b which the screw can be tightened is calculated by means of the following formula:

$$M_a = M_{a\ 0\%} + (M_{a\ 100\%} - M_{a\ 0\%}) \times t_{Boost} / t_{Duration},$$

where $M_{a\ 0\%}$ is a minimal tightening torque required for a reliable screw connection; $M_{a\ 100\%}$ is a maximum tightening torque applicable to the screw; $t_{Boost}$ is the duration of the second phase up to the penetration of the screw; and $t_{Duration}$ is the second phase up to the reaching of a maximum possible revolution speed and/or axial feed force.

The minimal tightening torque $M_{a\ 0\%}$ is thus used when the screw has already penetrated the component during the first phase. The maximum tightening torque $M_{a\ 100\%}$ is used when the screw penetrates the component on reaching the maximum possible revolution speed and/or axial feed force. If the screw only enters into the component after the time duration $t_{Duration}$, the tightening torque is not increased even further, but the screw is rather also tightened with the maximum tightening torque $M_{a\ 100\%}$ in this case.

A further subject of the invention is an apparatus having the features of the independent apparatus claim. It comprises a device for detecting the penetration of the screw and a drive control that increases the revolution speed of the screw and/or the axial feed force on the screw during a second phase if defined switching parameters are not reached, for example if the feed path, the feed rate, or the feed force does not change substantially or characteristically during a first phase. The revolution speed of the screw applied by the apparatus and/or the axial feed force applied by the apparatus can hereby be automatically adapted to a revolution speed or axial feed force required for penetrating the component.

The detection device can determine the penetration of the screw, for example, with reference to the feed path, with reference to an abrupt increase of the feed rate, and/or with reference to an abrupt reduction of the axial feed force.

In accordance with an embodiment, a determination device is additionally provided that determines the revolution speed at which the screw penetrates the component. The determined revolution speed can be a desired revolution speed and/or an actual revolution speed. The mechanical resistance of the component can be established in this manner that, for example, permits conclusions on the component thickness at the joining point.

Alternatively or additionally, the determination device can determine the axial feed force and/or the point in time at which the screw penetrates the component. The determined axial feed force can here be a desired axial feed force and/or an actual axial feed force. The mechanical resistance of the component can likewise be established using this parameter.

To preclude measurement error, the determination device preferably determines all three parameters, i.e. both the revolution speed and the axial feed force and also the point in time at which the screw penetrates the component.

In accordance with a particularly inexpensive embodiment, the determination device is integrated in the detection device. In this case, the detection device not only detects the penetration of the screw through the component, for example with reference to a feed path, with reference to an abrupt increase of the feed rate, and/or with reference to an abrupt decrease of the axial feed force, but also additionally the mechanical resistance of the component, for example with reference to the maximum axial feed force prior to the penetration of the screw, with reference to the maximum revolution speed prior to the penetration of the screw and/or with reference to the point in time of the penetration of the screw. The detection device in this case therefore satisfies a dual function.

Specifically, a processor can be provided to establish the mechanical resistance of the component during the setting of a screw, said processor calculating the mechanical resistance of the component with respect to the revolution speed, to the axial feed force, and/or to the point in time at which the screw penetrates the screw.

In addition this processor or a further processor can be provided to establish an increased tightening torque for the screw in dependence on the mechanical resistance of the component. The screw can thus be tightened in accordance with the mechanical resistance of the component.

Figure 2:
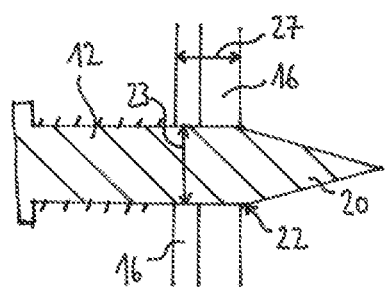
Figure 3:
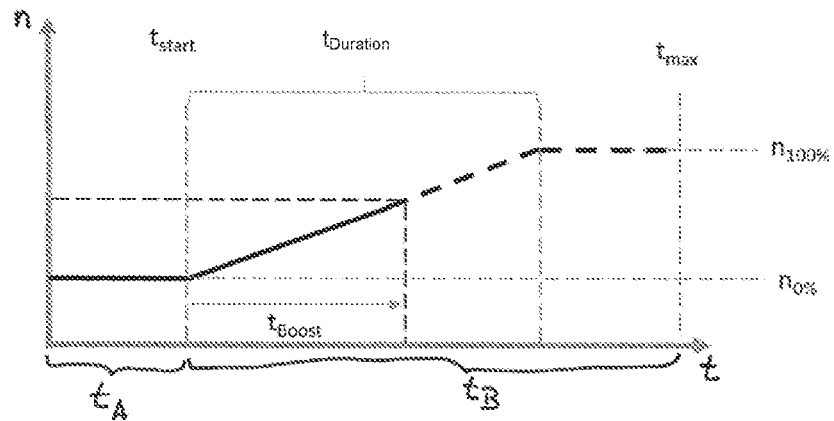
Figure 4:
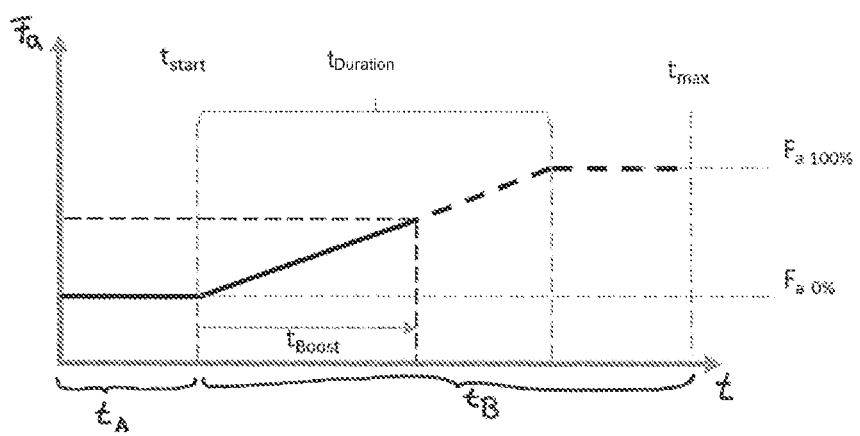

The invention will be described in the following with reference to a purely exemplary embodiment and to the enclosed drawings. There are shown:

FIG. 1 a flowchart of a method in accordance with the invention;

FIG. 2 a screw that has penetrated a component;

FIG. 3 a progression characteristic for the revolution speed;

FIG. 4 a progression characteristic for the axial force; and

Figure 5:
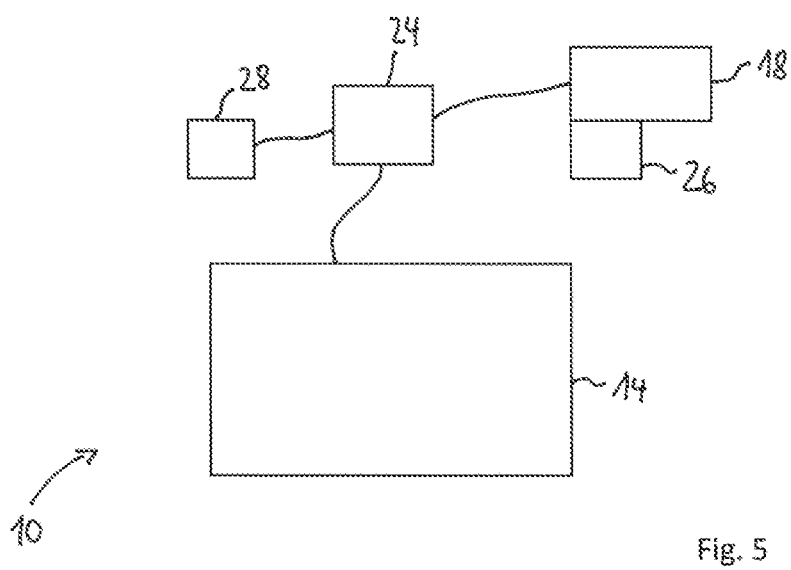

FIG. 5 a schematic representation of an apparatus in accordance with the invention.

FIG. 1 shows a flowchart of a method in accordance with the invention with which a screwing apparatus 10 (FIG. 5) can be operated. In a first step A, a flow-drilling screw 12 (FIG. 2) is driven by a drive unit 14 during a time-limited first phase to (FIGS. 3 and 4) that lasts approximately 0.5 seconds at a first revolution speed no % and a first axial feed force $F_{a\ 0\%}$ to drive the screw 12 through a component 16, for example through two metal sheets disposed areally over one another and accessible at one side. In this respect, in parallel with step A, it is continuously established by a detection apparatus 18 whether the screw 12 has penetrated the component 16. With flow-drilling screws, the screw 12 has penetrated the component when—as shown in FIG. 2—a conically tapering tip 20 of the screw 12 again passes out of the component 16 and the hole 22 in the component 16 generated by the screw 12 has a minimal diameter 23 that corresponds to the diameter of a threadless shaft of the screw 12.

If the screw 12 has not yet penetrated the component 16 after the end of the first phase $t_A$, a drive control 24 starts a second phase $t_B$ that comprises a boost stage $t_{Boost}$ in a step B following step A. During the second phase $t_B$, the revolution speed n (FIG. 3) is constantly increased up to a maximum revolution speed $n_{max}$ provided that the screw 12 does not previously penetrate the component 16. At the same time, the axial feed force $F_a$ (FIG. 4) is likewise constantly increased up to a maximum axial feed force $F_{a\ max}$, provided that the screw 12 has not previously penetrated the component 16. A detection is further continuously made during the increase of the revolution speed n or of the axial feed force $F_a$ whether the screw 12 has penetrated the component 16. If the latter is the case, the revolution speed n and the axial feed force $F_a$ are reduced to values that are suitable for forming a thread.

If the screw 12 does not penetrate the component 16 up to a point in time at which a maximum revolution speed $n_{100\%}$ and a maximum axial feed force $F_{a\ 100\%}$ have been reached, the screw 12 is further driven at the maximum revolution speed $n_{100\%}$ and at the maximum axial feed force $F_{a\ 100\%}$ until either the screw 12 has penetrated the screw 12 or a maximum time $t_{max}$ has been reached. If the maximum time $t_{max}$ has been reached, the screwing apparatus 10 aborts the setting of the screw 12. if the screw penetrates the component before reaching the maximum time $t_{max}$, the revolution speed n and the axial feed force $F_a$ are reduced to values that are suitable for forming a thread.

If the screw 12 enters into the component 16 during the second phase $t_B$, a duration $t_{Boost}$ from the start of the second phase $t_B$ up to the penetration of the screw 12 through the component 16 is established by means of a determination device 26 in a step C. The duration $t_{Boost}$ is dependent on a mechanical resistance of the component 16, i.e. inter alia on the thickness 27 of the component 16 and on its strength, and can therefore be used as a characteristic for the mechanical resistance. An increased tightening torque $M_a$ is calculated for the screw 12 in a step D by means of the duration $t_{Boost}$, and indeed according to the formula $$M_a = M_{a\ 0\%} + (M_{a\ 100\%} - M_{a\ 0\%}) \times t_{Boost}/t_{Duration},$$

where $M_{a\ 0\%}$ is a minimal tightening torque required for a reliable screw connection; $M_{a\ 100\%}$ is a maximum tightening torque applicable to the screw; $t_{Boost}$ is the time duration of the second phase up to the penetration of the screw 12; and $t_{Duration}$ is the duration of the second phase up to the reaching of the maximum possible revolution speed $n_{100}\%$ and/or maximum possible axial feed force $F_{a\ 100\%}$.

In a step E, the screw 12 is tightened with the increased tightening torque $M_a$. Each screw is thus tightened in dependence on the respective material thickness or metal sheet thickness of the component. It is thus ensured that every screw 12 set using this method is tightened ideally, i.e. neither too weakly nor too tightly, while taking account of the mechanical load capacity of the component 16.

FIGS. 3 and 4 show the progression of the revolution speed n and of the axial feed force $F_a$ during the method outlined in FIG. 1. The revolution speed n is constantly maintained at a minimum revolution speed $n_{0\%}$ in the first phase to for approximately 0.5 seconds. The same applies to the axial feed force $F_a$ that is maintained at a minimum feed force $F_{a\ 0\%}$. If the screw 12 has not yet penetrated the component 16 after the end of the first phase $t_A$, the revolution speed n and the axial feed force $F_a$ are constantly increased from a starting time $t_{start}$ onward for the second phase over a time period of a maximum of 0.5 to 1.5 seconds until the screw 12 penetrates the component 16 after a boost time $t_{Boost}$. The boost time $t_{Boost}$ thus stands for the time duration during the second phase $t_B$ until the screw 12 has penetrated the component 16.

It can occur—as described above—that the screw 12 has also not yet penetrated the component 16 up to the reaching of a maximum possible revolution speed $n_{100\%}$ and of a maximum possible axial feed force $F_{a\ 100\%}$. After the end of a time $t_{Duration}$ in which the revolution speed n and/or the axial feed force $F_a$ is/are increased up to their maximum values n 100%, $F_{a\ 100\%}$, the screw 12 is driven at an unchanged revolution speed $n_{100\%}$ and an unchanged axial feed force $F_{a\ 100\%}$ up to a maximum duration $t_{max}$. If the screw 12 has not yet entered into the component 16 after the end of the maximum duration $t_{max}$, the screwing apparatus 10 is switched off and the setting process is aborted as incomplete.

FIG. 5 schematically shows a screwing apparatus 10 for performing the method outlined in FIG. 1. The screwing apparatus 10 is in particular suitable to introduce flow-drilling screws 12 into a component 16. The screwing apparatus 10 comprises the drive unit 14 that is configured to set the screw 12 into rotation and simultaneously to exert an axial feed force onto the screw 12. The screwing apparatus 10 further comprises the detection device 18 that determines a feed path and/or a feed rate of the screw 12 and/or that determines a feed force applied to the screw 12 to determine when the screw 12 has penetrated the component 16. It can, for example, be recognized by an increase of the feed rate or a reduction of the feed force to be applied to the screw 12 that the screw 12 has penetrated the component 16. The screwing apparatus 10 further comprises the drive control 24 that increases the revolution speed n of the screw 12 and/or the axial feed force $F_a$ on the screw 12 during the second phase if the feed path, the feed rate, or the feed force does not substantially or characteristically change over the duration of the first phase and thus the screw 12 has not yet penetrated the component 16. The drive control 24 is connected to the detection device 18 that communicates to the drive control 24 that the screw 12 has penetrated the component 16.

The screwing apparatus 10 additionally comprises the determination device 26 that establishes the point in time at which the screw 12 has penetrated the component 16 or establishes the boost time $t_{Boost}$. The screwing apparatus 10 comprises a processor 28 that has a characteristic value for the mechanical resistance of the component 16 communicated to it. The mechanical resistance of the component 16 is expressed in the present example by the required time during the second phase $t_B$ until the screw 12 has penetrated the component 16, i.e. the boost time $t_{Boost}$. The processor 28 calculates an increased tightening torque $M_a$ for the screw 12, that increases as the boost time $t_{Boost}$ increases, from the determined boost time $t_{Boost}$.

REFERENCE NUMERAL LIST 10 screwing apparatus
12 screw 14 drive unit
16 component
18 detection device
20 tip
22 hole
23 diameter
24 drive control
26 determination device
27 thickness
28 processor
A step 1
B step 2
C step 3
D step 4
E step 5
$t_A$ first phase
$t_B$ second phase
n revolution speed
$F_a$ axial feed force
$n_{0\%}$ first revolution speed
$F_{a\ 0\%}$ first axial feed force
$n_{100\%}$ maximum revolution speed
$F_{a\ 100\%}$ maximum axial feed force
$t_{start}$ start time of the boost phase
$t_{Boost}$ boost phase
$t_{Duration}$ time duration up to $n_{100\%}$ and/or $F_{a\ 100\%}$
$t_{max}$ maximum time
$M_a$ tightening torque
$M_{a\ 0\%}$ minimal tightening torque
$M_{a\ 100\%}$ maximum tightening torque

The invention claimed is:

1. A screwing apparatus for setting a screw, the screwing apparatus comprising
    a drive unit that is configured to set the screw into rotation and to exert an axial feed force on the screw to drive the screw through at least one component;
    a device, configured to detect a penetration of the screw through the component during a first phase, that determines at least one of a feed path, a feed rate of the screw, and the axial feed force applied to the screw; and
    a drive control configured to automatically increase at least one of a revolution speed of the screw and the axial feed force on the screw during a second phase if at least one of the feed path, the feed rate, and the axial feed force, determined by the device, does not change substantially or characteristically during the first phase.

2. The screwing apparatus in accordance with claim 1, wherein the screw is a flow-drilling screw.

3. The screwing apparatus in accordance with claim 1,
    wherein at least one determination device is provided that determines at least one of the revolution speed, the axial feed force, and a point in time at which the screw penetrates the component.

4. The screwing apparatus in accordance with claim 3,
    further comprising a processor that determines a mechanical resistance of the component with reference to at least one of the revolution speed, the axial feed force, and the point in time at which the screw penetrates the component.

5. The screwing apparatus in accordance with claim 4,
    wherein the mechanical resistance of the component is at least one of a thickness of the component and a strength of the component.

6. The screwing apparatus in accordance with claim 4,
    further comprising a processor that is configured to establish an increased tightening torque for the screw in dependence on the mechanical resistance of the component.

7. The screwing apparatus in accordance with claim 1, wherein the drive control is configured to automatically increase at least one of the revolution speed of the screw and the axial feed force on the screw during a second phase only if at least one of the feed path, the feed rate, and the axial feed force does not change substantially or characteristically during a first phase.

* * * * *